No. 735,815. PATENTED AUG. 11, 1903.
O. A. POIRIER.
BEARING FOR DRILL DEVICES.
APPLICATION FILED APR. 13, 1903.
NO MODEL. 2 SHEETS—SHEET 2.
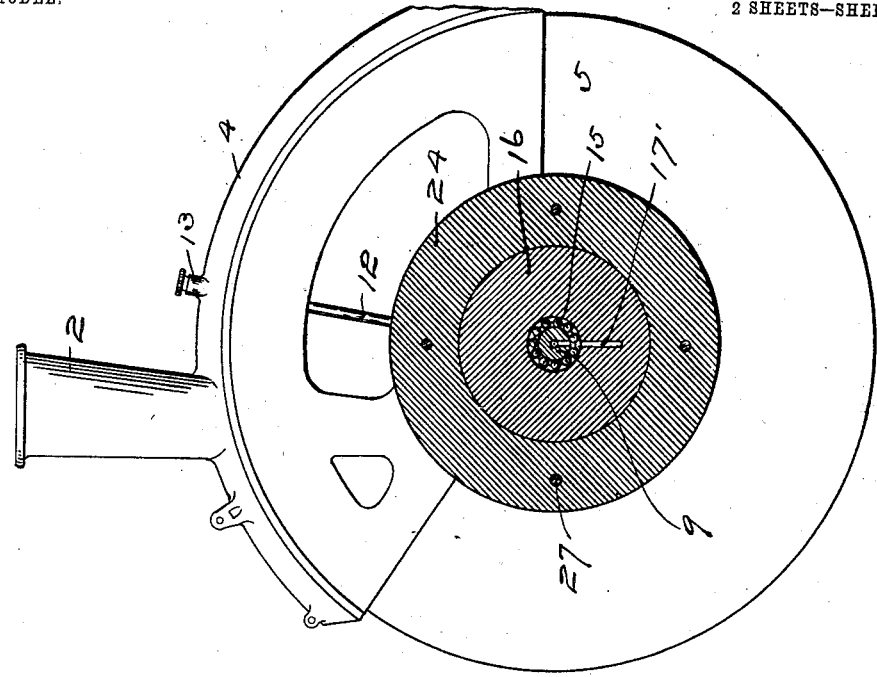
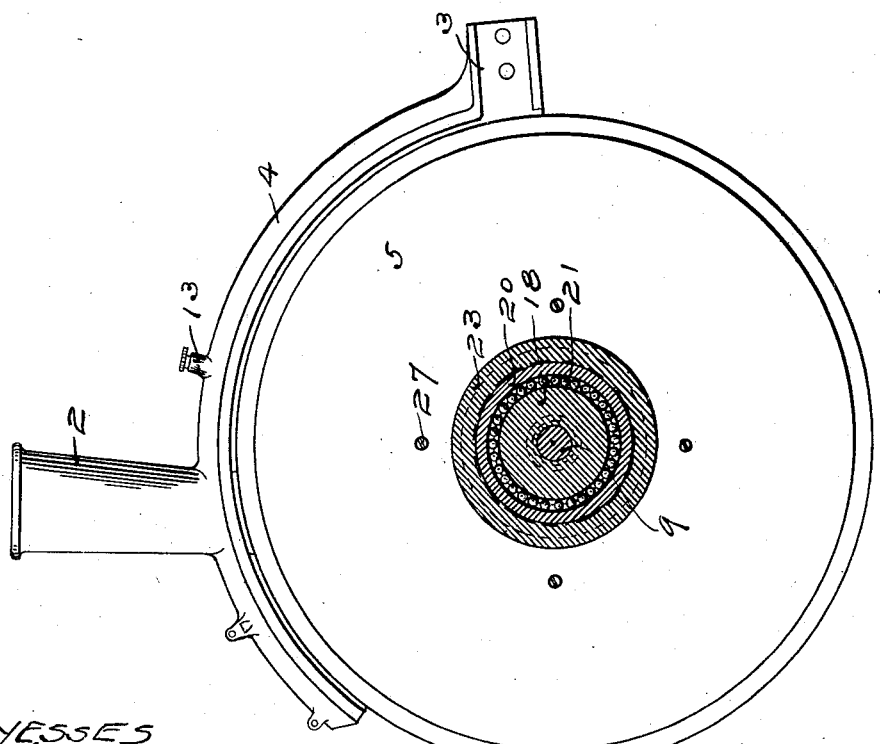
WITNESSES
INVENTOR
OCTAVE A. POIRIER
By Paul & Paul
His Attorneys No. 735,815.  
Patented August 11, 1903.

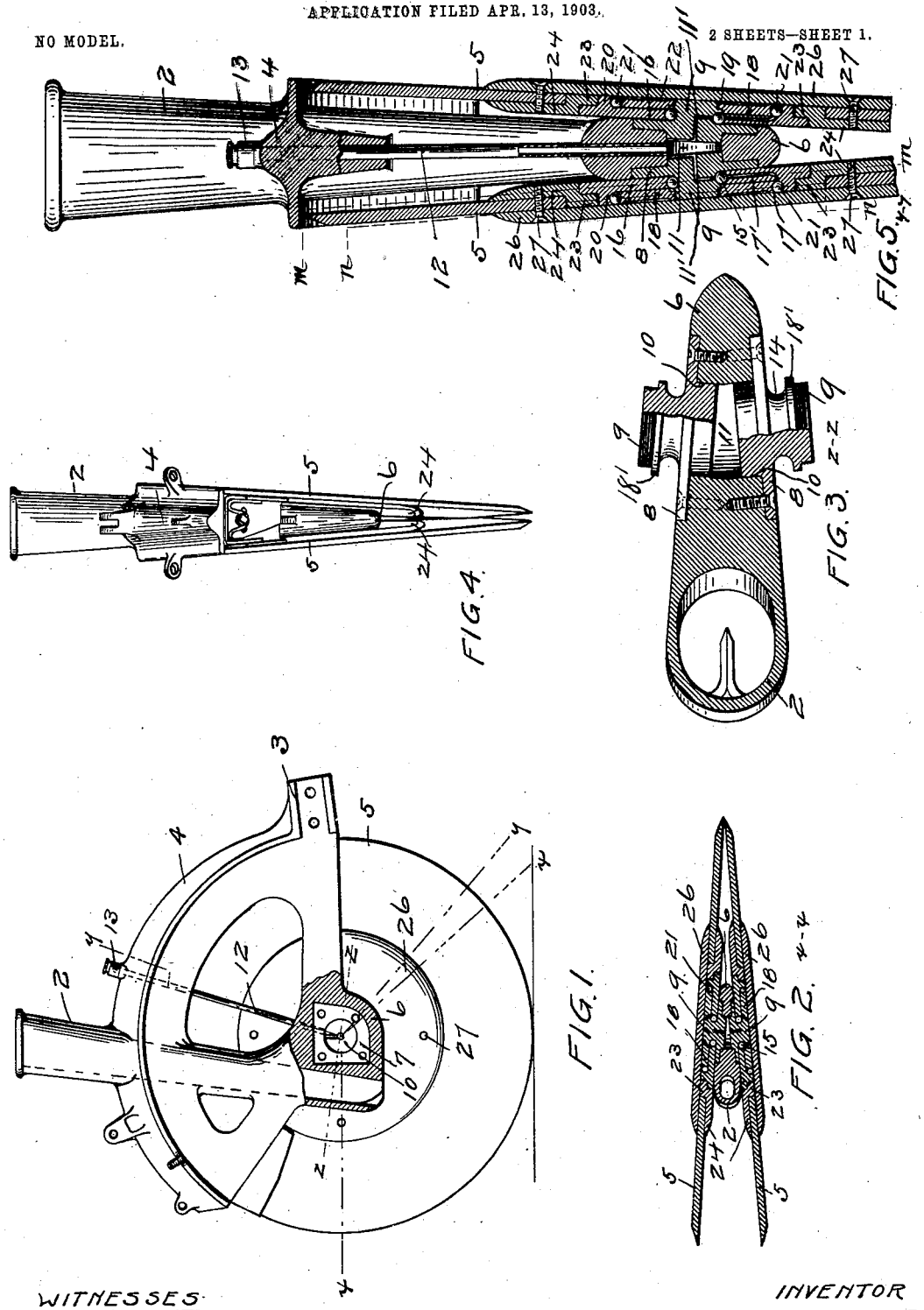

UNITED STATES PATENT OFFICE.

OCTAVE A. POIRIER, OF GLADSTONE, MINNESOTA.

BEARING FOR DRILL DEVICES.

SPECIFICATION forming part of Letters Patent No. 735,815, dated August 11, 1903.

Application filed April 13, 1903. Serial No. 152,294. (No model.)

*To all whom it may concern:*

Be it known that I, OCTAVE A. POIRIER, of Gladstone, county of Ramsey, State of Minnesota, have invented certain new and useful Improvements in Bearings for Drill-Disks, of which the following is a specification.

My invention relates to disk drills wherein the disks are arranged in pairs; and the object of the invention is to provide an improved ball-bearing and one that will be practically dust and dirt proof.

A further object is to provide an improved means for supplying oil to said bearings.

The invention consists generally in various constructions and combinations, all as hereinafter described, and particularly pointed out in the claims.

In the accompanying drawings, forming part of this specification, Figure 1 is a side elevation of a drill-disk with my invention applied thereto. Fig. 2 is a section on the line x x of Fig. 1. Fig. 3 is a section on the line z z of Fig. 1. Fig. 4 is a rear view of the disks and the boot whereon they are mounted, and Fig. 5 is a section on the line y y of Fig. 1. Fig. 6 is a vertical section on the line n n of Fig. 5. Fig. 7 is a vertical section on the line m m of Fig. 5.

In the drawings, 2 represents a boot having the usual drag-bar connection 3, connected with the boot proper by a web 4.

5 5 represents disks that are mounted upon each side of the boot.

The essential feature of my invention consists in arranging the disks on bearings that are practically dust-proof and much lighter running than those in ordinary use.

In carrying out my invention I provide the lower end 6 of the boot with sockets 7, wherein plates 8 are secured, and these plates are provided with hubs 9, having threaded outer ends and inner ends that fit within a hole 10, that extends through the boot from side to side. A space is provided between the inner ends of said hubs, forming an oil-reservoir 11, communicating with a duct 12, that extends up through the boot and is provided with a cap 13. The hub is provided with an oil duct or passage 11', leading to the ball-bearing, hereinafter described. An annular way 14 is provided in the surfaces of said hub to receive bearing-balls 15, and a disk 16 has a central opening to receive said hub and an annular groove 17 around said opening to rest upon the surface of said balls. An oil-duct 17' leads from said annular groove to the bearing provided near the periphery of said disk 16. A disk 18 has a threaded hole 19 to receive the end of said hub and holds the disk 16 in place and is prevented from coming in contact with the balls by an annular rib 18' on said hub. I prefer to provide an annular rib 20 on the disk 16, between which and the edge of the disk 18 the bearing-balls 21 may be provided. If preferred, however, the latter ball-bearing may be omitted. A space 22 is preferably provided between the disks 16 and 18 to reduce the area of their contacting surfaces, and consequently the friction between the same. The disk 18 being screwed in place on the hub will hold the disk 16 in position and prevent the bearing-balls of the hub from becoming dislodged, the rib 20 being provided with an exterior thread to receive a threaded flange 23 on a ring 24, that is adapted to fit over the disk 16 and turn therewith. The drill-disk 5 has a central opening of sufficient size to slip over the flange 23, and when the said drill-disk has been placed in position its outer face will be flush with the face of the flange 23 and also with that of the disk 18. A thin plate 26 is then placed over the bearings and the end of the hub and secured to the drill-disk and the ring 24 by screws 27 or by other suitable means. The joint thus formed will be practically dust-proof, and the ball-bearings will materially reduce the friction between the moving parts and allow a freedom of movement of the drill-disks on their supporting-hubs that will greatly reduce the draft of the machine.

I have described the bearing of the drill-disk on one side of the boot; but it will be understood that a similar bearing is provided for the one on the other side.

I claim—

1. In a disk drill, the combination, with a boot, of hubs mounted thereon between which an oil-reservoir is provided, an oil-duct leading to said reservoir, ball-bearings provided on said hubs, disks mounted on said bearings, and oil-ducts leading from said reservoir to said bearings.

2. In a disk drill, the combination, with a boot provided with a socket extending therethrough near its lower end, of hubs mounted in said socket, a space being provided near their inner ends forming an oil-reservoir, a duct communicating with said reservoir, ball-bearings provided on the outer ends of said hubs, disks mounted on said bearings, and oil-ducts leading from said reservoir to said bearings.

3. In a disk drill, the combination, with a boot, of the hubs mounted thereon, disks supported in bearings on said hubs, drill-disks, plates provided over the ends of said hubs, and means securing first-named disks, said drill-disks and said plates together.

4. In a drill-disk, the combination, with a boot, of the hubs secured thereon, disks having bearings on said hubs and provided with ribs having threaded outer faces, rings fitting over said disks and having flanges provided with inner threaded edges to engage the threaded faces of said ribs, drill-disks fitting over said flanges, plates fitting over said drill-disks and said hubs, and screws passing through said plates, said drill-disks and said rings and securing them together.

5. In a drill-disk, the combination, with a boot, of hubs secured thereon and having threaded outer ends, disks having ball-bearings on said hubs intermediate to their ends, caps having threaded sockets to receive the ends of said hubs, drill-disks, plates provided on said drill-disks over the ends of said hubs, and means securing said last-named plates, said drill-disks and said first-named disks together.

6. In a disk drill, the combination, with a boot, of hubs secured thereon, disks having ball-bearings on said hub, rings inclosing said disks and having threaded connections therewith, drill-disks provided on said rings, plates on the outer faces of said drill-disks, and means securing said plates and rings together through said drill-disks, substantially as described.

7. In a disk drill, the combination, with a boot having an opening extending therethrough from side to side, of hubs secured within said opening, disks having ball-bearings on said hubs, and means for holding said disks in position on said hubs, plates provided over the outer ends of said hubs, drill-disks arranged between said first-named disks and said plates, and means securing said first-named disks, said drill-disks and said plates together.

8. In a disk drill, the combination, with a boot, of hubs mounted in said boot and having annular grooves and outer threaded ends, disks having holes to receive said hubs, and balls provided in said grooves between said disks and hubs, caps fitting the threaded outer ends of said hubs, plates provided outside said hubs and disks, drill-disks arranged between said first-named disks and said plates, and screws passing through said plates, said drill-disks and said first-named disks and securing them together.

9. In a disk drill, the combination, with a boot, of a hub having an outer threaded end mounted therein, a disk having a ball-bearing on said hub, a cap fitting the threaded end of said hub and concealing said bearing, a drill-disk, and a plate provided over said cap and the outer end of said hub and between which and said first-named disk said drill-disk is secured.

10. In a disk drill, the combination, with a boot, of a hub mounted therein, a disk having a ball-bearing on said hub, means for holding said disk in place on said hub, a drill-disk, and a plate covering said hub and between which and said first-named disk said drill-disk is secured.

11. In a disk drill, the combination, with a boot, of hubs mounted thereon, disks having ball-bearings on said hubs, means for holding said disks in place, plates covering said hubs, drill-disks provided between said plates and said first-named disks, and means for securing said plates and said disks together.

12. The combination, with a drill-boot, of a hub thereon, a member having a ball-bearing on said hub, a drill-disk, and means covering the outer end of said hub and between which means and said member said drill-disk is secured.

13. The combination, with a drill-boot, of a hub mounted thereon, a ball-bearing provided on said hub, a drill-disk mounted on said bearing, an oil-reservoir provided in said boot, a filling-duct leading to said reservoir and a discharge-duct leading from said reservoir to said bearing.

In witness whereof I have hereunto set my hand this 26th day of March, 1903.

OCTAVE A. POIRIER.

In presence of—
RICHARD PAUL,
C. G. HANSON.